United States Patent
Ekl et al.

(10) Patent No.: US 6,898,414 B2
(45) Date of Patent: May 24, 2005

(54) METHOD FOR ACKNOWLEDGING MESSAGES IN A COMMUNICATION SYSTEM

(75) Inventors: Randy L. Ekl, Lake Zurich, IL (US); Ron Rotstein, Arlington Heights, IL (US)

(73) Assignee: Motorola, Inc., Schaumburg, IL (US)

( * ) Notice: Subject to any disclaimer, the term of this patent is extended or adjusted under 35 U.S.C. 154(b) by 79 days.

(21) Appl. No.: 10/281,596

(22) Filed: Oct. 28, 2002

(65) Prior Publication Data

US 2004/0082294 A1 Apr. 29, 2004

(51) Int. Cl.$^7$ .............................................. H04Q 7/20
(52) U.S. Cl. .................... 455/3.05; 455/517; 370/347; 370/461
(58) Field of Search .............................. 455/3.05, 12.1, 455/13.1, 427, 453, 426, 560, 18, 434, 515; 370/321, 347, 329

(56) References Cited

U.S. PATENT DOCUMENTS

| | | | | |
|---|---|---|---|---|
| 5,036,518 A | * | 7/1991 | Tseung | 714/748 |
| 5,241,691 A | * | 8/1993 | Owen | 455/517 |
| 5,247,702 A | * | 9/1993 | Su et al. | 455/509 |
| 5,412,803 A | * | 5/1995 | Bartow et al. | 709/213 |
| 5,436,620 A | * | 7/1995 | Ide | 340/7.52 |
| 5,625,892 A | * | 4/1997 | Bauman et al. | 455/69 |
| 5,677,909 A | * | 10/1997 | Heide | 370/347 |
| 5,797,085 A | * | 8/1998 | Beuk et al. | 455/88 |
| 6,108,542 A | * | 8/2000 | Swanchara et al. | 455/434 |
| 6,301,232 B1 | * | 10/2001 | Dutta | 370/321 |
| 6,424,870 B1 | * | 7/2002 | Maeda et al. | 700/4 |
| 6,556,550 B1 | * | 4/2003 | Rasanen | 370/329 |
| 6,556,827 B1 | * | 4/2003 | Oh | 455/3.05 |
| 6,578,170 B1 | * | 6/2003 | Piret et al. | 714/758 |
| 6,694,471 B1 | * | 2/2004 | Sharp | 714/749 |
| 6,747,966 B1 | * | 6/2004 | Ahmavaara | 370/337 |
| 2002/0159544 A1 | * | 10/2002 | Karaoguz | 375/329 |
| 2003/0188010 A1 | * | 10/2003 | Raza et al. | 709/238 |

* cited by examiner

Primary Examiner—Nick Corsaro
Assistant Examiner—Tan Trinh
(74) Attorney, Agent, or Firm—Terri S. Hughes; Indira Saladi

(57) ABSTRACT

At a first device (102 or 104), a message is received and processed. If the message is processed during a first time period, the first device transmits an acknowledgement message during a second time period; otherwise the first device transmits the acknowledgment message during a third time period. The second time period and the third time period are exclusive of each other.

18 Claims, 5 Drawing Sheets

| FC | DUR | RA | BSSID | FCS |
|---|---|---|---|---|
| 01/1110 | FFFF | FF:FF:FF:FF:FF:FF | 01:02:03:04:05:06 | 7D36 |

METHOD FOR ACKNOWLEDGING MESSAGES IN A COMMUNICATION SYSTEM

FIELD OF THE INVENTION

The present invention relates generally to wireless data communication systems, and is especially applicable to mobile devices utilizing communication schemes, such as turbocoding schemes, and other methods which would cause responding units to delay acknowledgements.

BACKGROUND OF THE INVENTION

Wireless systems use a variety of methods to establish and maintain communications between devices. In wireless local area network ("WLAN") systems, communications is typically between a fixed access point ("AP") and a mobile station ("MS"), as illustrated in FIG. 1. As the distance increases between the AP and an MS, the physical layer coding rate is adjusted to ensure that wireless messages are received properly.

A class of coding methods which have been developed to help ensure that wireless messages are received properly over longer ranges are turbocodes. Turbocoded messages are different than non-turbocoded messages in that for turbocoded messages, the bits of the original message are convoluted and otherwise operated upon to help ensure their successful reception and subsequent processing. A result of these operations is that the receiving device needs to receive the entire message prior to processing any portion of the message, i.e., to perform the reverse operations to get back to the original message. Additionally, processing turbocoded messages is an iterative process, which means that the message must be operated upon multiple times to get back to the original message. This also takes additional time.

For non-turbocoded messages, each bit can be processed upon reception. Due to this difference between turbocoded messages and non-turbocoded messages, it takes longer for a receiving MS or AP to determine the integrity of a turbocoded message, and subsequently it takes longer for a receiving MS or AP to reply to a turbocoded message.

This is a problem, as the timing structure for acknowledgements on a communication system, such as a WLAN system, specifically an 802.11 system, is fixed, and the time allowed for responses (acknowledgements) from the receiver to the sender of the message is short. Specifically, the time allowed for the acknowledgements is shorter than the time to process a turbocoded message.

Thus, there exists a need for a method to transmit and process delayed acknowledgements for messages that require additional processing time.

BRIEF DESCRIPTION OF THE FIGURES

The features of the present invention are set forth with particularity in the appended claims. The invention, together with its preferred embodiments, may be best understood by reference to the accompanying drawings in which:

DETAILED DESCRIPTION OF THE PREFERRED EMBODIMENT

Figure 1:
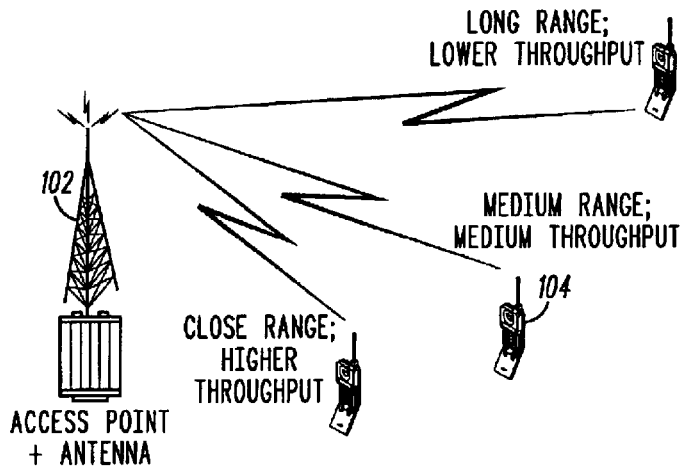
FIG. 1 illustrates a plurality of mobile stations operating within range of a WLAN access point.

It will be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate identical elements The present invention proposes structuring the air interface scheduling, specifically the contention free period of a superframe. For ease of explanation, it is important to note that the present invention will specifically refer to turbocoded messages, however, the present invention is applicable to any type of message, such as turbocoded messages, encrypted messages, forward error corrected messages, or the like, that may require additional processing time to decoded the message, thus preventing the recipient device from acknowledging the message within the allotted acknowledgement time.

In accordance with the present invention, the AP schedules inbound and outbound turbocoded messages ahead of other, non-turbocoded messages. Scheduling turbocoded messages ahead of other, non-turbocoded messages allows the recipient device of the turbocoded message time to process the turbocoded message and transmit a Delayed Acknowledgement ("Ack") message after the processing is completed, but prior to the end of the superframe. Further, a Delayed Ack message is transmitted after the allotted acknowledgement time to transmit Ack messages for other non-turbocoded messages has expired. It should be noted, that for the present invention, the non-turbocoded messages adhere to the fundamental timing rules of the air interface as known in the art, and the turbocoded messages adhere to the fundamental timing rules of the air interface in all cases except the Ack messages for the turbocoded message.

Figure 2:
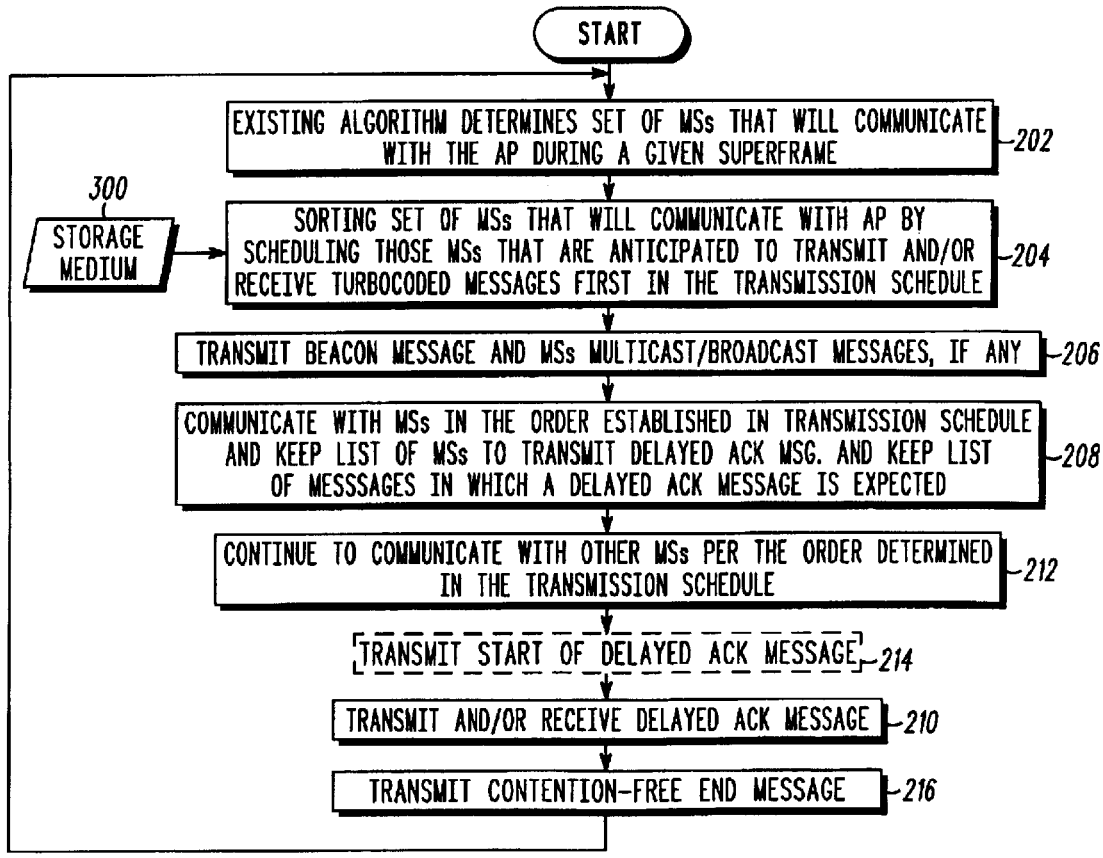
FIG. 2 illustrates a flow chart by which the AP schedules and coordinates the transmissions to and of MSs in accordance with the present invention.

FIG. 2 illustrates a flow chart by which the AP 102 schedules and coordinates transmissions to and/or from the MSs in accordance with the present invention. First, the AP 102, at step 202, determines a set of MSs to which it will communicate with during a given superframe using existing algorithms as currently known in the art; the present invention defines a superframe as it is generally accepted in the art, i.e., as an interval of time between consecutive Beacon messages, inclusive of the first Beacon message, but not the second Beacon message.

The MSs identified in the set comprises MSs to which outbound Data messages are addressed during the given superframe, and MSs to be polled for inbound Data messages during the given superframe. The present invention defines outbound messages as originating at the AP 102 and terminating at the MS; the present invention further defines inbound messages as originating at the MS and terminating at the AP 102.

Once the set of MSs is established, the AP 102 generates a transmission schedule at step 204. The transmission schedule is arranged such that MSs that are transmitting inbound messages and/or receiving outbound messages that are likely to be turbocoded are scheduled first. The likelihood that a MS will transmit a turbocoded inbound message is typically based on the transmission rate of the previous inbound message transmitted by the MS; the likelihood that a MS will receive a turbocoded outbound message is typically based on the power level of the AP 102, the distance between the AP and the MS, and/or the success and rate of the previously transmitted outbound message transmitted by the AP 102.

Figure 3:
FIG. 3 illustrates a storage medium storing the coding by which the MS are transmitting and/or receiving messages in accordance with the present invention.

FIG. 3 illustrates an example of a storage medium 300 that maintains information about which MSs are likely to transmit and/or receive turbocoded messages. It should be noted that the information captured in FIG. 3 is for example purposes only, and should not be interpreted as being inclusive or exclusive. The AP 102 stores the storage medium 300 locally or the AP has remote access to the storage medium.

In accordance with the present invention, the AP 102 communicates with MSs that are likely to transmit and/or receive messages that are turbocoded earlier in the superframe in order to provide the recipient device of the turbocoded message additional processing time to decode the turbocoded message. After the turbocoded message is processed, and before the end of the superframe, a Delayed Ack message is transmitted outside of the allotted acknowledgement time in which to acknowledge non-turbocoded messages in accordance with the present invention since the processing time required to decode a turbocoded message typically requires more time than the allotted time period used to process non-turbocoded messages.

Thus, once the transmission schedule is established in accordance with the present invention, the AP 102 transmits a Beacon message, which signifies to the MSs the beginning of the superframe, as well as other information, and begins to transmit multicast/broadcast messages to the MSs, if any, at step 206. The AP 102 at any point during the superframe, however, can transmit these multicast/broadcast messages. These multicast/broadcast messages typically contain information pertinent to a plurality of MSs, for example, server announcements, or information to improve system operation. Alternately, the AP 102 can establish the transmission schedule in accordance with the present invention concurrently and in parallel with the transmission of the Beacon message.

Once the Beacon message, and multicast/broadcast messages, if any, has been transmitted at step 206, the AP 102 begins to initiate communication with the MSs in the order established in the transmission schedule. As stated above, the AP 102 preferably communicates first with MSs that are likely to transmit and/or receive messages that are turbocoded at step 208.

If the AP 102 receives an inbound message that is turbocoded, the AP 102 preferably adds the address of the MS that transmitted the inbound turbocoded message to a Transmit Delayed Ack list; the Transmit Delayed Ack list is used to indicate to the AP 102 which MSs to send a Delayed Ack message after the processing of the inbound turbocoded message has been completed, but prior to the end of the superframe at step 210. In the preferred embodiment, the AP 102 transmits any Delayed Ack messages just prior to the end of the contention-free period of the superframe, but the Delayed Ack message can be transmitted beforehand. While the AP is processing the inbound turbocoded message(s), the AP 102 continues to poll for inbound messages and/or transmit outbound messages to other MSs at step 212 in accordance with the transmission schedule established in step 204.

If the AP 102 transmits an outbound message that is turbocoded, the AP 102 preferably stores the outbound message in a storage medium and adds the address of the MS to which the outbound turbocoded message is addressed to an Expect Delayed Ack list; the Expect Delayed Ack list is used to indicate to the AP 102 which MSs will be sending a Delayed Ack message, typically after the AP 102 transmits a Start of Delayed Ack ("SODA") message at step 214. The SODA message initiates the beginning of a predetermined period of time the AP 102 schedules during the contention-free period of the superframe in which MSs are able to transmit their inbound Delayed Ack messages. Thus, each MS that has an outbound turbocoded message addressed to it sets its individual counter upon receipt of the outbound turbocoded message and waits a calculated period of time before it transmits its inbound Delayed Ack message after receipt of the SODA message. The calculated period of time is based on when their outbound turbocoded message was received with respect to the other outbound turbocoded messages.

If there is any time remaining in the superframe after all of the scheduled transmissions and acknowledgments have been transmitted, the AP 102 typically transmits a Contention Free End message at step 216 that allows the air interface to become contentious until the end of the superframe, as known in the art. It should be noted that the process described with respect to FIG. 2 is repeated for each, superframe.

Figures 4, 5:
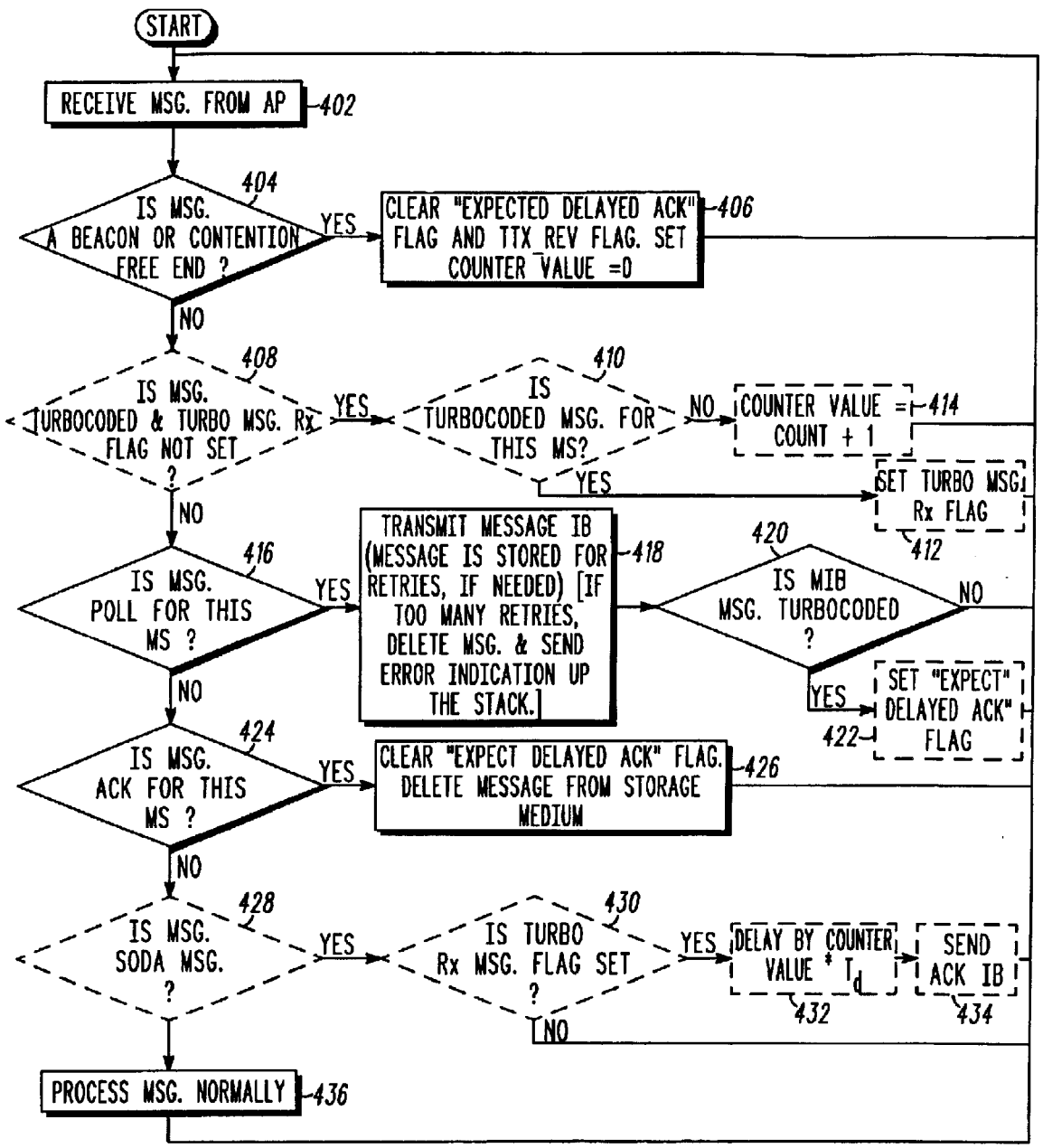
FIG. 4 illustrates a flow chart by which the MS transmits inbound in accordance with the present invention.
FIG. 5 illustrates a message structure for a start of delayed ACK message in accordance with the present invention.

FIG. 4 illustrates a flow chart by which the MS 104 receives and/or transmits messages to and/or from the AP 102 in accordance with the present invention. When the MS 104 receives a message from the AP 102 at step 402, the MS 104 must first determine the type of message that was received, and respond accordingly.

In the preferred embodiment, if the MS 104, at step 404, determines that the outbound message received by the MS 104 is a Beacon message or a Contention Free End message, the MS 104 clears all flags and sets all counters to zero at step 406; the MS 104 clears all flags and sets all counters to zero upon receipt of the Beacon message or the Contention Free End message because, as noted above, each Beacon message received indicates to the MS 104 the beginning of a new superframe, and each Contention Free End message indicates to the MS 104 that all scheduled inbound and outbound transmissions have been completed, thus any flags that were set or counters that were incremented were based on the transmission schedule from a previous superframe, or the transmission schedule has been completed and no longer valid. After the MS 104 clears all flags and sets all counters to zero, the MS 104 preferably enters an idle or sleep state until a next message is received from the AP 102, if after a Beacon message, or enters into a contention based operation, if after a Contention Free End message.

In the preferred embodiment, if, at step 408, the MS 104 determines that the outbound message received is a turbocoded message from the AP and its Turbocoded Message Received flag is not set, the MS 104 identifies the destination address for the outbound turbocoded message at step 410. If the destination address is that of the MS 104, the MS 104 sets its Turbocoded Message Received flag at step 412; otherwise, the MS 104 increments its counter by one at step 414. After the MS 104 sets its flag or increments its counter by one, the MS 104 preferably enters an idle or sleep state until a next message is received from the AP 102.

In the preferred embodiment, if the MS 104 determines that the outbound message received by the MS 104 is a Polling message addressed to the MS 104 at step 416, the MS 104 transmits its inbound message to the AP 102 at step 418. Preferably, upon transmission, the MS 104 also stores the inbound message in a storage medium for a predetermined time period in case there is a need to retransmit the inbound message; if there are too many retry attempts (as determined by a system parameter), the message is deleted from the storage medium. Once the inbound message has been transmitted, however, the MS 104 determines if the inbound message was turbocoded at step 420. If the inbound message was turbocoded, the MS 104 sets the Expect Delayed Ack flag at step 422 and preferably enters into an idle or sleep state until a next message is received from the AP 102. If the inbound message was not turbocoded, then the MS 104 preferably enters into an idle or sleep state until a next message is received from the AP 102.

In the preferred embodiment, if the MS 104 determines that the outbound message received by the MS 104 is an Ack message addressed to the MS 104 at step 424, the MS 104 clears the Expect Delayed Ack flag, if set, and deletes the message stored in the storage medium at step 426. After the MS 104 clears the Expect Delayed Ack flag and deletes the stored message in response to the outbound message, the MS 104 preferably enters into an idle or sleep state until a next message is received from the AP 102.

In the preferred embodiment, if the MS 104 determines that the outbound message received by the MS 104 is a SODA message at step 428, the MS 104 further determines if the Turbocoded Message Received flag is set at step 430. An example of a SODA message is illustrated in FIG. 5, where the "FC" field indicates the frame control (type, subtype, etc.), the "Dur" field indicates the duration of the message, the "RA" field indicates the receive address, the "BSSID" field indicates the basic service set identification, and the "FCS" field indicates the frame check sum. If the Turbocoded Message Received flag is set, the MS 104 waits a predetermined time (counter times $T_d$) at step 434 and transmits an inbound Delayed Ack message to the AP 102 at step 436; otherwise, the MS 104 preferably enters into an idle or sleep state until a next message is received from the AP 102. Each MS has a unique counter value based on the order in which the turbocoded message addressed to it was sent from the AP with respect to other turbocoded messages addressed to other MSs. As noted above, in the preferred embodiment, the counter value at each MS is incremented every time a turbocoded message is received (regardless of its destination) until a turbocoded message is addressed to the particular MS. Alternatively, in the case where a particular MS receives more than one turbocoded message addressed to it during a single superframe, the MS increments its counter value every time a turbocoded message is received (regardless of its destination), and sets a flag and stores the current counter value upon receipt of the turbocoded message addressed to it. Thus, since each MS waits a different amount of time to send its Delayed Ack message (based on its unique counter value), the air interface will remain non-contentious.

In the preferred embodiment, if the MS 104 determines that the outbound message received by the MS 104 is a type different than those itemized above, the MS 104 processes the message in any suitable manner as typically known in the art at step 436.

Figure 6:
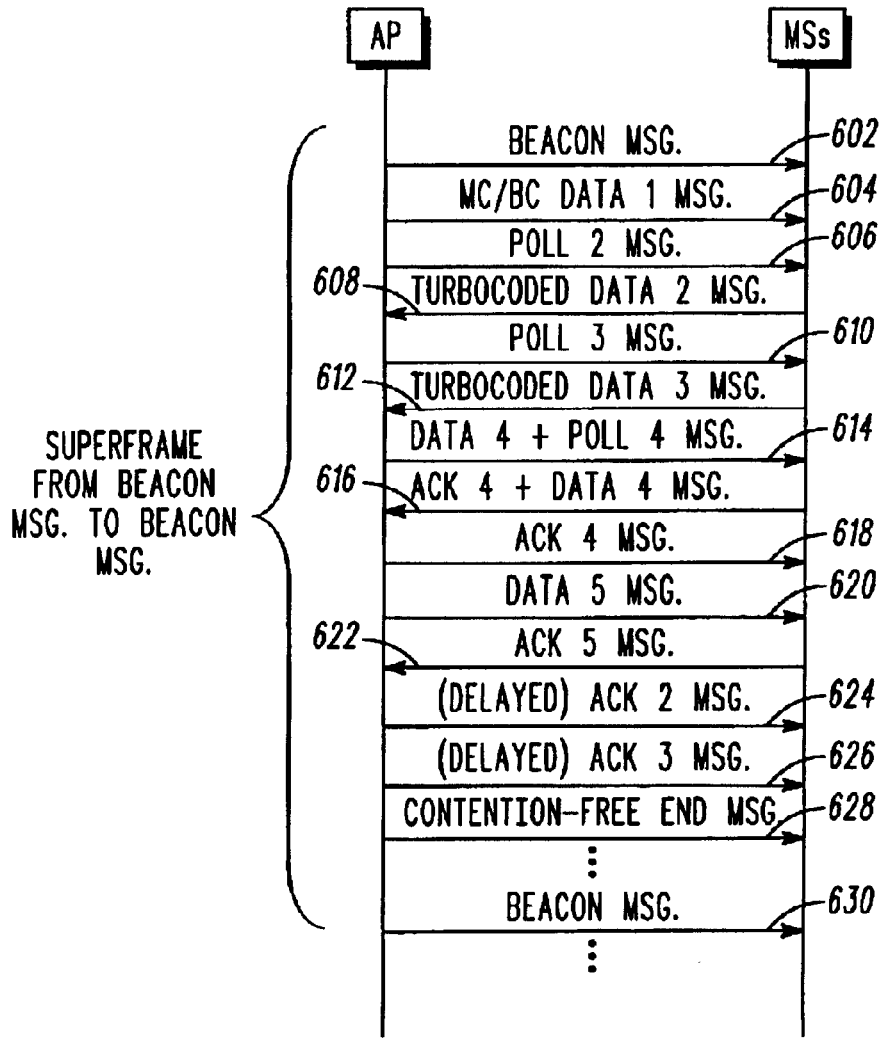
FIG. 6 illustrates a message sequence chart for the system operation for inbound turbocoded messages in accordance with the present invention.

Let us now look at some examples of the present invention. FIG. 6 illustrates an example of a message sequence flow diagram for the system operation when the AP 102 receives inbound turbocoded messages in accordance with the present invention. The present invention assumes that the AP 102 and the MSs are functioning properly, and the MSs are registered and associated with the AP 102. As described above, the AP 102 determines the set of MSs in which it will communicate with during the superframe and the transmission schedule identifying the order of inbound and outbound transmissions, particularly scheduling the MSs transmitting inbound messages likely to be turbocoded prior to all other MSs transmitting and/or receiving messages that are not turbocoded. In this example, once the processing has been complete, the AP 102 transmits a first Beacon message at step 602 and any multicast and/or broadcast messages at step 604. The AP 102 then polls $MS_2$ for any inbound messages at step 606. Once $MS_2$ hears the Polling message, $MS_2$ transmits an inbound turbocoded Data message at step 608. It is important to note that since the inbound message transmitted by $MS_2$ is turbocoded, the AP 102 typically requires additional processing time than the acknowledgement time allocated to transmit a standard Ack message; as a result, the AP 102 will transmit a Delayed Ack message to $MS_2$ later in the superframe after the AP 102 processes the message, but prior to the end of the superframe. Thus, upon receipt of the inbound turbocoded message, the AP 102 adds the address of $MS_2$ to the Transmit Delayed Ack list.

While the AP 102 is processing the inbound turbocoded message from $MS_2$, the AP 102 transmits a Polling message addressed to $MS_3$ at step 610. In response to the Polling message, $MS_3$ also transmits an inbound turbocoded message to the AP 102 at step 612. Upon receipt of the inbound turbocoded message from $MS_3$, the AP 102 adds the address of $MS_3$ to the Transmit Delayed Ack list.

While processing the inbound turbocoded messages for $MS_2$ and $MS_3$, the AP 102 continues to communicate with the other MSs in accordance with the transmission schedule by transmitting an outbound Data message to $MS_4$ and also transmitting a Polling message to $MS_4$ at step 614. $MS_4$ transmits an Ack message to the AP 102 acknowledging the outbound Data message and also transmits its inbound message, which is not turbocoded, to the AP 102 at step 616. Since the inbound message that was transmitted by $MS_4$ was not turbocoded, the AP 102 is able to process/decode the message, and transmit a standard Ack message, as known in the art, within the allotted acknowledgement time at step 618. According to the transmission schedule, the AP 102 transmits an outbound Data message to $MS_5$ at step 620, and the $MS_5$ processes/decodes the message and transmits an Ack message back to the AP 102 at step 622.

At this point in the example, the scheduled inbound and outbound transmissions have been completed, and the AP 102 begins to acknowledge those messages that required additional processing time than the allotted acknowledgement time (e.g., the turbocoded messages). As a result, the AP 102 transmits Delayed Ack messages for $MS_2$ and $MS_3$ at steps 624 and 626, respectively. In this example, the Delayed Ack messages were transmitted after all scheduled inbound and outbound transmissions have been completed, however, the AP 102 could have transmitted the Delayed Ack message(s) to $MS_2$ and/or $MS_3$ after the processing of the respective message is completed and while the air interface is non-contentious.

In this example, since there is time remaining in the superframe after all scheduled transmissions are completed, and after all the Delayed Ack messages are transmitted, the AP 102 transmits a Contention Free End message at step 628 to all the MSs associated with the AP 102. The Contention Free End message signifies to the MSs that the air interface is now contentious until the end of the superframe, which is typically until the transmission of the next Beacon message by the AP 102 at step 630.

Figure 7:
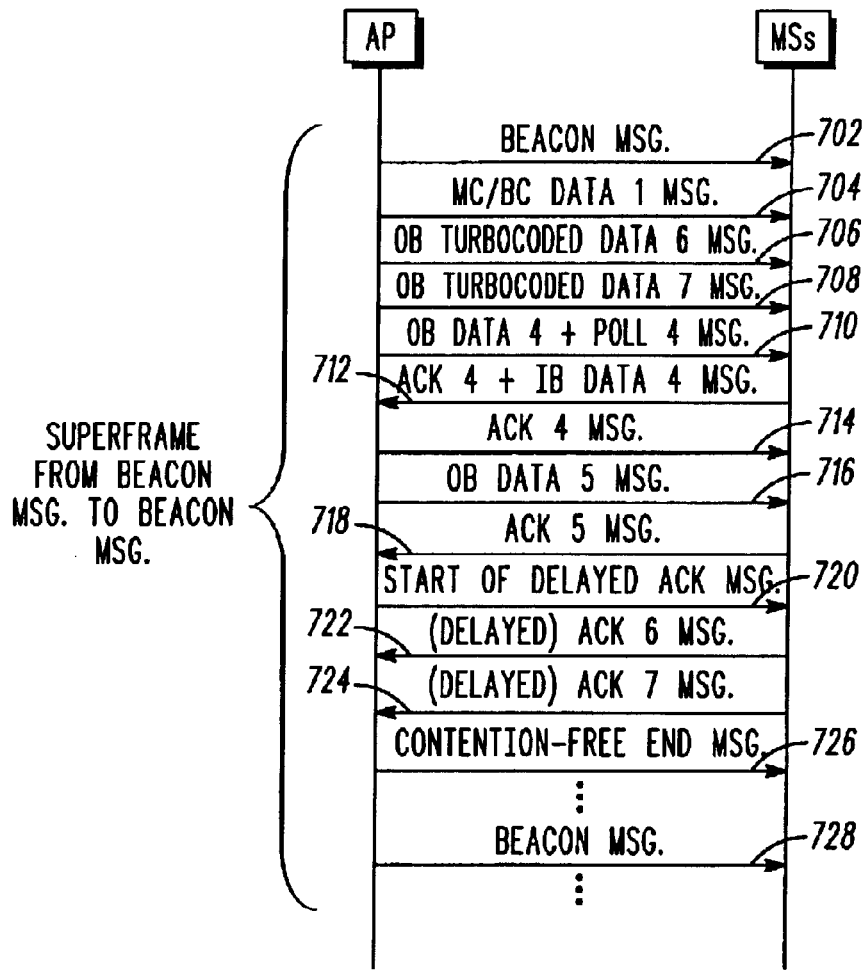
FIG. 7 illustrates a message sequence chart for the system operation for outbound turbocoded messages in accordance with the present invention.

Moving ahead to the next example, FIG. 7 illustrates an example of a message sequence flow diagram for the system operation when the AP 102 transmits outbound turbocoded messages in accordance with the present invention. As with the previous example, the present invention assumes that the AP 102 and the MSs are functioning properly, and the MSs are registered and associated with the AP 102. In this example, as described above, the AP 102 determines the set of MSs in which it will communicate with during the superframe and the transmission schedule identifying the order of inbound and outbound transmissions, particularly scheduling the MSs receiving outbound messages that are likely to be turbocoded prior to all other MSs transmitting and/or receiving message that are not turbocoded.

In this example, once the processing has been complete, the AP 102 transmits a first Beacon message at step 702 and any multicast and/or broadcast messages at step 704. The AP 102 then transmits an outbound turbocoded message to $MS_6$ at step 706 and an outbound turbocoded message to $MS_7$ at step 708. Upon receipt of the outbound turbocoded messages, $MS_6$ and $MS_7$ respectively set their Turbocoded Message Received flag and set their respective counter values with respect to the order in which the outbound turbocoded messages were addressed to the particular MSs. Thus, since the first outbound turbocoded message was addressed to $MS_6$, $MS_6$ stores the counter value of zero. $MS_7$, however, increments its counter value to one upon receipt of the outbound turbocoded message addressed to $MS_6$; since the second outbound turbocoded message was addressed to $MS_7$, $MS_7$ stores the counter value of one. The AP 102 also transmits an outbound Data message to $MS_4$ and polls $MS_4$ for any inbound messages at step 710. Since the outbound message to $MS_4$ is not turbocoded, $MS_4$ transmits an Ack message to the AP 102 after successfully processing the outbound message, and transmits to the AP 102 an inbound Data message at step 712. Again, since the inbound Data message transmitted by $MS_4$ was not turbocoded, the AP 102 is able to transmit the Ack message within the allotted acknowledgement time at step 714. This process continues with the AP 102 transmitting an outbound Data message to $MS_5$ at step 716, and $MS_5$ transmitting an Ack message to the AP 102 upon successful processing of the outbound Data message at step 718.

Since the AP 102 typically controls the scheduling of the superframe, if there are outbound turbocoded messages scheduled in the superframe, the AP 102 transmits a SODA message at step 720; preferably after all scheduled inbound and outbound messages have been transmitted. The SODA message indicates to the MSs who have received outbound messages from the AP 102 that were turbocoded to start transmitting Delayed Ack messages after waiting its respective calculated predetermined time (count time $T_d$). As such, $MS_6$ waits its calculated predetermined time, transmits an inbound Delayed Ack message to the AP 102 at step 722, and clears its Turbocoded Message Received flag. $MS_7$ preferably waits its calculated predetermined time (which in this example is longer than the calculated predetermined time for $MS_6$), transmits its inbound Delayed Ack message to the AP 102 at step 724, and clears its Turbocoded Message Received flag. Unlike the example illustrated in FIG. 6, the Delayed Ack messages transmitted inbound are transmitted only after the SODA message is received. Since the MSs do not establish the transmission schedule, the SODA message acts as an indicator to the MSs as to when to start waiting their calculated predetermined time before transmitting the Delayed Ack message in order to maintain a contention free environment.

After all the Delayed Ack messages have been transmitted and received, or after a predetermined time has elapsed, the AP 102 transmits a Contention Free End message at step 726, if time is available, which allows the air interface to be contentious until the end of the superframe. The end of the superframe is signified by receipt of a new Beacon message transmitted from the AP 102 at step 728.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

Moreover, the term "a" or "an", as used herein, are defined as one or more than one. The term "plurality", as used herein, defined as two or more than two.

The term "another", as used herein, is defined as at least a second or more. The terms "including" and/or "having", as used herein, are defined as comprising (i.e., open language).

We claim:

1. A method comprising the steps of:
at a first device in a wireless system whereby the wireless system has a protocol comprising at least one superframe, wherein the at least one superframe is an interval of time between consecutive beacon messages;
receiving a message in a first superframe;
processing the message; and
if the message is processed during a first time period, transmitting an acknowledgement message during a second time period, otherwise transmitting the acknowledgment message during a third time period,
wherein the second time period and the third time period are exclusive of each other, and
wherein the first time period, the second time period, and the third time period are in the first superframe.

2. The method of claim 1 wherein only the acknowledgement message is allowed to be transmitted during the second time period.

3. The method of claim 1 wherein the message is selected from a group consisting of: a turbocoded message, an encrypted message, and a forward error corrected message.

4. The method of claim 1 wherein the message was transmitted by a first device, and further comprising the step of adding an address of the first device to a list if the message is not processed during the first time period.

5. The method of claim 4 further comprising the step of deleting the address of the first device from the list after transmitting the acknowledgement message for the message.

6. The method of claim 4 further comprising the step of removing the address of the first device from the list after the acknowledgement message is transmitted during the third time period.

7. The method of claim 1 further comprising the step of transmitting at least a second message to at least a second device during the third time period.

8. The method of claim 1 wherein the message is received during a superframe, and wherein the third time period begins at the end of the second time period and ends at the end of the superframe.

9. The method of claim 1 further comprising the step of receiving a second message, and wherein the third time period begins upon receipt of the second message.

10. The method of claim 9 wherein the second message is a start of delayed acknowledgement message.

11. A method comprising the steps of:
receiving a message in a first superframe, wherein the at least one superframe is an interval of time between consecutive beacon messages;
determining whether the message can be processed during a first time period;
if the message can be processed during the first time period, processing the message and transmitting an acknowledgement message during a second time period, wherein only the acknowledgement message is allowed to be transmitted during the second time period; and
if the message cannot be processed during the first time period, setting a flag to transmit the acknowledgement during a third time period after the message has been processed,
wherein the second time period and the third time period are exclusive of each other, and
wherein the first time period, the second time period, and the third time period are in the first superframe.

12. A method comprising the steps of:
at a first device in a wireless system whereby the wireless system has a protocol comprising at least one superframe, wherein the at least one superframe is an interval of time between consecutive beacon messages;
receiving a message;
determining whether the message is of a first type or a second type;
if the message is of the first type, setting a flag when the message is addressed to the first device otherwise, incrementing a counter value, wherein the counter value is associated with a period of time;
if the message is of the second type, transmitting an acknowledgement message for the message for which the flag was set after waiting the period of time associated with the counter value at the time the flag was sets,
wherein the message and the acknowledgement message are in one superframe.

13. The method of claim 12 wherein the message is of a first type if the message cannot be processed by the first device within a first time period.

14. The method of claim 12 wherein the message is of the first type if the message is one of: a turbocoded message, an encrypted message, and a forward error corrected message.

15. The method of claim 12 wherein the message is of the second type if the message is a start of delayed acknowledgement message.

16. The method of claim 12 further comprising the steps of:
determining that the message is of a third type;
clearing the flag that was set; and
re-setting the counter value to a default value.

17. The method of claim 16 wherein the message is of the third type if the message is one of a beacon message and a contention free end message.

18. A method comprising the steps of:
at a first device in a wireless system whereby the wireless system has a protocol comprising at least one superframe, wherein the at least one superframe is an interval of time between consecutive beacon messages;
receiving at least one type-one message;
incrementing a counter value each time a type-one message is received that is addressed to another device, wherein the counter value is associated with a period of time;
setting a flag each time a type-one message is received that is addressed to the first device;
receiving a type-two message;
transmitting an acknowledgement message for each message in which a flag was set after waiting the period of time associated with the counter value at the time each flag was set,
wherein the at least one type-one message, the type-two message, and the acknowledgement message are in one superframe.

* * * * *

UNITED STATES PATENT AND TRADEMARK OFFICE
CERTIFICATE OF CORRECTION

PATENT NO.    : 6,898,414 B2                                Page 1 of 1
DATED         : May 24, 2005
INVENTOR(S)   : Ekl et al.

It is certified that error appears in the above-identified patent and that said Letters Patent is hereby corrected as shown below:

Column 9,
Line 44, change "sets" to -- set --.

Signed and Sealed this

Twenty-ninth Day of November, 2005

JON W. DUDAS
*Director of the United States Patent and Trademark Office*